(12) United States Patent
Severson et al.

(10) Patent No.: US 9,612,636 B2
(45) Date of Patent: Apr. 4, 2017

(54) TOKEN-BASED POWER-SWITCH CONTROL CIRCUITS

(71) Applicant: QUALCOMM Incorporated, San Diego, CA (US)

(72) Inventors: Matthew Levi Severson, Austin, TX (US); Shih-Hsin Jason Hu, San Diego, CA (US); Dipti Ranjan Pal, San Diego, CA (US); Madan Krishnappa, San Diego, CA (US); Jeffrey Gemar, San Diego, CA (US); Noman Ahmed, San Diego, CA (US); Mohammad Tamjidi, San Diego, CA (US); Mark Kempfert, San Francisco, CA (US)

(73) Assignee: QUALCOMM Incorporated, San Diego, CA (US)

(*) Notice: Subject to any disclaimer, the term of this patent is extended or adjusted under 35 U.S.C. 154(b) by 219 days.

(21) Appl. No.: 14/497,258

(22) Filed: Sep. 25, 2014

(65) Prior Publication Data
US 2016/0091939 A1 Mar. 31, 2016

(51) Int. Cl.
*G06F 1/32* (2006.01)
*G06F 1/26* (2006.01)
*G06F 9/44* (2006.01)

(52) U.S. Cl.
CPC .............. *G06F 1/26* (2013.01); *G06F 1/32* (2013.01); *G06F 1/3287* (2013.01); *G06F 9/4405* (2013.01)

(58) Field of Classification Search
CPC ..... G06F 1/32; G06F 1/26; G06F 1/28; G06F 1/00
(Continued)

(56) References Cited

U.S. PATENT DOCUMENTS

| | | | |
|---|---|---|---|
| 6,792,553 B2* | 9/2004 | Mar .................. | G06F 1/305 327/143 |
| 6,879,139 B2* | 4/2005 | Brown ............... | G06F 1/263 323/299 |

(Continued)

OTHER PUBLICATIONS

Kahng A.B., et al., "Many-Core Token-Based Adaptive Power Gating," IEEE Transactions on Computer-Aided Design of Integrated Circuits and Systems, 2012, pp. 1-5.

(Continued)

*Primary Examiner* — Jaweed A Abbaszadeh
*Assistant Examiner* — Keshab Pandey
(74) *Attorney, Agent, or Firm* — Arent Fox LLP

(57) ABSTRACT

A method for operating an electronic apparatus is provided. The method includes receiving a token, activating a power switch for powering up a core in response to the receiving the token, and outputting the token based on a state of powering up the core. The outputting of the received token is delayed until the state of powering up the core is reached. In one aspect, an electronic apparatus includes a power switch configured to power up to a core is provided. A power-switch control circuit is configured to receive a token, activate the power switch for powering up the core in response to receiving the token, output the received token based on a state of powering up the core. The outputting of the received token is delayed until the state of powering up the core is reached. A plurality of the power-switch control circuits is configured as a ring.

19 Claims, 9 Drawing Sheets

(58) Field of Classification Search
USPC ....... 713/300, 310, 320, 321, 322, 323, 324, 713/330, 340, 375
See application file for complete search history.

(56) References Cited

U.S. PATENT DOCUMENTS

| | | | |
|---|---|---|---|
| 7,960,862 B2 | 6/2011 | Smith et al. | |
| 8,504,967 B2 | 8/2013 | Suzuki et al. | |
| 2007/0110438 A1* | 5/2007 | Su | H04J 14/0204 398/45 |
| 2008/0263373 A1* | 10/2008 | Meier | G06F 9/3017 713/300 |
| 2010/0017630 A1* | 1/2010 | Chen | G06F 1/189 713/300 |
| 2014/0025966 A1* | 1/2014 | Iwami | G06F 1/26 713/300 |

OTHER PUBLICATIONS

Kahng A.B., et al., "TAP: token-based adaptive power gating," Proceedings of the 2012 ACM/IEEE international symposium on Low power electronics and design, 2012, pp. 203-208.

Nishida Y., et al., "Multi-Grain Power Control Scheme in Ultra-Low-Power Data-Driven Chip Multiprocessor: ULP-DDCMP," Proceedings of the 2011 International Conference on Parallel and Distributed Processing Techniques and Applications (PDPTA'11), 2011, pp. 435-441.

\* cited by examiner

TOKEN-BASED POWER-SWITCH CONTROL CIRCUITS

BACKGROUND

Field

The present disclosure relates generally to electronic apparatus with circuits, and more particularly, to electronic apparatuses with token-based power-switch control circuits.

Background

A typical electronic apparatus, such as a processor within wireless devices, may include various cores and power domains. A core may vary from a collection of transistors or circuits to a processor execution unit. Each of the cores may be powered by a power switch. An example of a power switch may include a transistor coupled to a power rail of a power domain and controlled to selectively provide power from the power rail to a core.

Increasingly, the cores are powered down and then powered up at various times to save power. When too many cores power up at the same time they draw too much power from the power rail, and the voltage in the power domain may drop. One design challenge is to power up the cores in a manner that does not draw too much power at once so as not to collapse the power domain.

SUMMARY

Aspects of an electronic apparatus are provided. The electronic apparatus includes a power switch configured to power up to a core. A power-switch control circuit is configured to receive a token, to activate the power switch for powering up the core in response to receiving the token, and to output the received token based on a state of powering up the core. The outputting of the received token is delayed until the state of powering up the core is reached.

Aspects of a method for operating an electronic apparatus are provided. The method includes receiving a token, activating a power switch for powering up a core in response to the receiving of the token, and outputting the token based on a state of powering up the core. The outputting of the received token is delayed until the state of powering up the core is reached.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

Figure 1:
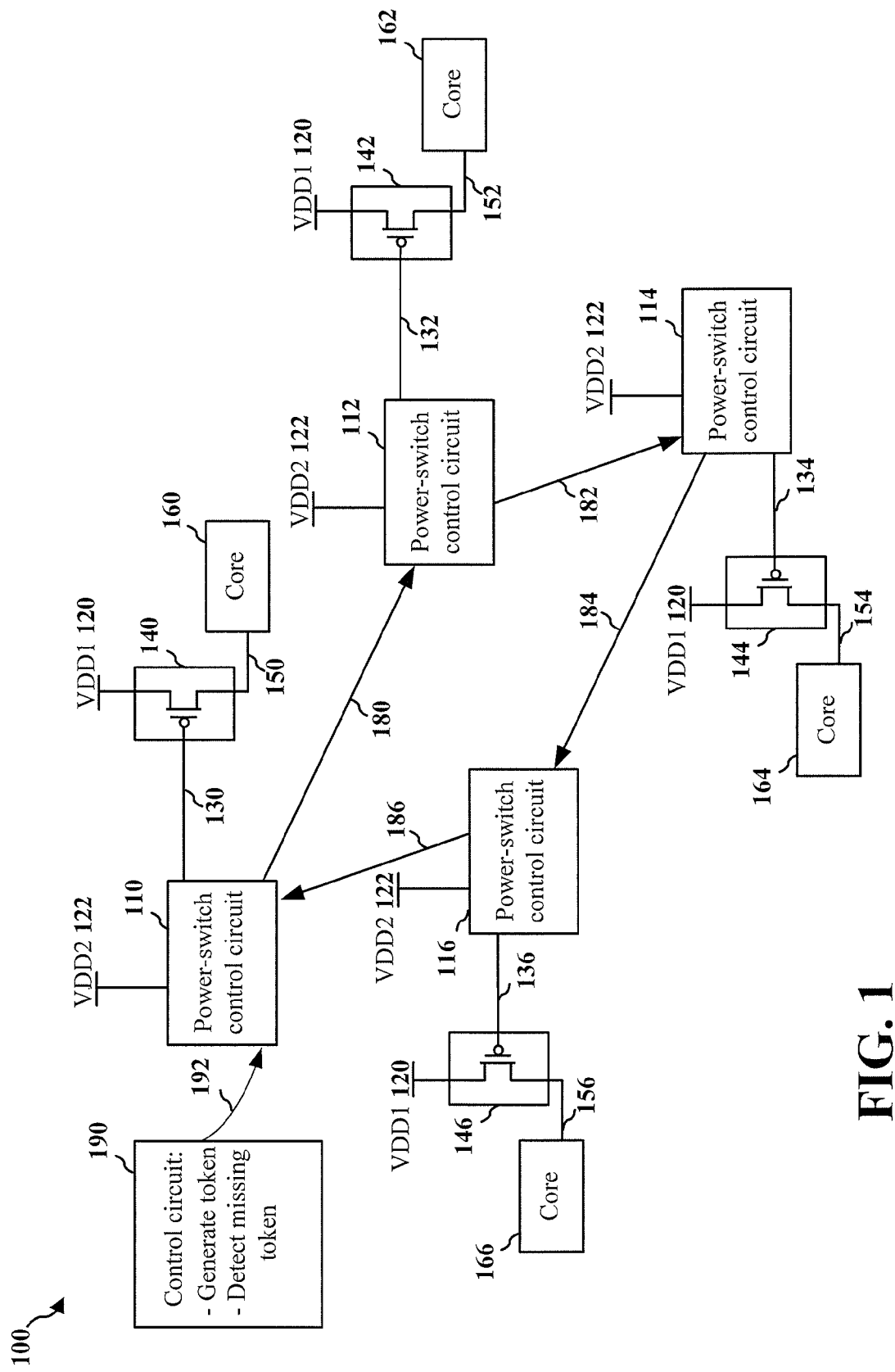
FIG. 1 is a block diagram of an exemplary token ring of power-switch control circuits.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Various apparatus and methods presented throughout this disclosure may be implemented in various forms of hardware. By way of example, any of these apparatus or methods, either alone or in combination, may be implemented as an integrated circuit, or as part of an integrated circuit. The integrated circuit may be an end product, such as a microprocessor, a digital signal processor (DSP), an application specific integrated circuit (ASIC), programmable logic, or any other suitable integrated circuit. Alternatively, the integrated circuit may be integrated with other chips, discrete circuit elements, and/or other components as part of either an intermediate product, such as a motherboard, or an end product. The end product can be any suitable product that includes integrated circuits, including by way of example, a cellular phone, personal digital assistant (PDA), laptop computer, a desktop computer (PC), a computer peripheral device, a multimedia device, a video device, an audio device, a global positioning system (GPS), a wireless sensor, or any other suitable device.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

When a "signal" is reference, the term may include the conductor carrying the described signal. The term "connection" may include a signal line. The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of the stated features, integers, steps, operations, elements, and/or components, but do not preclude the presence or addition of one or more other features, integers, steps, operations, elements, components, and/or groups thereof.

Various aspects of an electronic apparatus with cores and power switches for providing power to the cores are provided. An example of such electronic apparatus may be a processor for a wireless communication application. A power-switch control circuit activates the power switch to selectively provide power from a power rail to a core. In one implementation, the power-switch control circuit activates the power switch in response to receiving a token. The power-switch control circuit outputs the token to a second power-switch control circuit based on a state of powering up of the core. As those skilled in the art will readily appreciate, aspects and applications of the disclosure may not be limited to the described exemplary embodiments. Accordingly, all references to a specific application are intended only to illustrate exemplary aspects of the memory with the understanding that such aspects may have a wide differential of applications.

FIG. 1 is a block diagram of an exemplary token ring of power-switch control circuits. The token ring 100 includes power-switch control circuits 110, 112, 114, and 116 linked as a ring by signal lines (e.g., signals) 180, 182, 184, and 186. The diagram further illustrates power switches 140, 142, 144, and 146 and cores 160, 162, 164, and 166. As an example, the power-switch control circuit 110 controls and activates the power switch 140 for powering up the core 160, via the activation control signal 130. The power switch 140 is illustrated to include a P-type transistor for clarity, but the scope is not necessarily so limited. The power switch 140 is coupled to the power rail VDD1 120 (e.g., a voltage supply) and selectively provides power from the power rail VDD1 120 to the core 160 via the node 150. The power-switch control circuit 110 is powered at least in part by the power rail VDD2 122 (e.g., a voltage supply). In one implementation, VDD1 120 and VDD2 122 are different power rails or operate in different power domains.

Likewise, the power-switch control circuit 112 controls and activates the power switch 142 for powering up the core 162, via the activation control signal 132. The power switch 142 is illustrated to include a P-type transistor for clarity, but the scope is not necessarily so limited. The power switch 142 is coupled to the power rail VDD1 120 (e.g., a voltage supply) and selectively provides power from the power rail VDD1 120 to the core 162 via the node 152. The power-switch control circuit 114 controls and activates the power switch 144 for powering up the core 164, via the activation control signal 134. The power switch 144 is illustrated to include a transistor for clarity, but the scope is not necessarily so limited. The power switch 144 is coupled to the power rail VDD1 120 (e.g., a voltage supply) and selectively provides power from the power rail VDD1 120 to the core 164 via the node 154. The power-switch control circuit 116 controls and activates the power switch 146 for powering up the core 166 via the activation control signal 136. The power switch 146 is illustrated to include a transistor for clarity, but the scope is not necessarily so limited. The power switch 146 is coupled to the power rail VDD1 120 (e.g., a voltage supply) and selectively provides power from the power rail VDD1 120 to the core 166 via the node 156.

The power-switch control circuits 110, 112, 114, and 116 are configured to pass a token in a ring structure. For example, the power-switch control circuit 110 receives the token from the signal line 186 and outputs the token onto the signal line 180, when certain conditions (e.g., a state of powering up the core 160) are met. The power-switch control circuit 112 receives the token from the signal line 180 and outputs the token onto the signal line 182, when certain conditions (e.g., a state of powering up the core 162) are met. The power-switch control circuit 114 receives the token from the signal line 182 and outputs the token onto the signal line 184, when certain conditions (e.g., a state of powering up the core 164) are met. The power-switch control circuit 116 receives the token from the signal line 184 and outputs the token onto the signal line 186 and back to the power-switch control circuit 110, when certain conditions (e.g., a state of powering up the core 166) are met. Thus, the power-switch control circuit 112 is configured to output the token to the power-switch control circuit 110 (via the power-switch control circuit 114 and the power-switch control circuit 116).

A control circuit 190 is coupled to the power-switch control circuit 110. The control circuit 190 may include logic gates to perform the functions described herein, processor(s) performing those functions, logic gates generating the signals described herein, or combinations thereof. The control circuit 190 may cause the power-switch control circuit 110 to generate a token onto the signal line 180 for, e.g., initiating a token in the token ring 100 after detecting a failure in the token ring 100 (via 192). For example, the control circuit 190 may cause the power-switch control circuit 110 to determine that a token is not being passed around the ring 100, and then cause the power-switch control circuit 110 to generate a new token in response.

Figure 2:
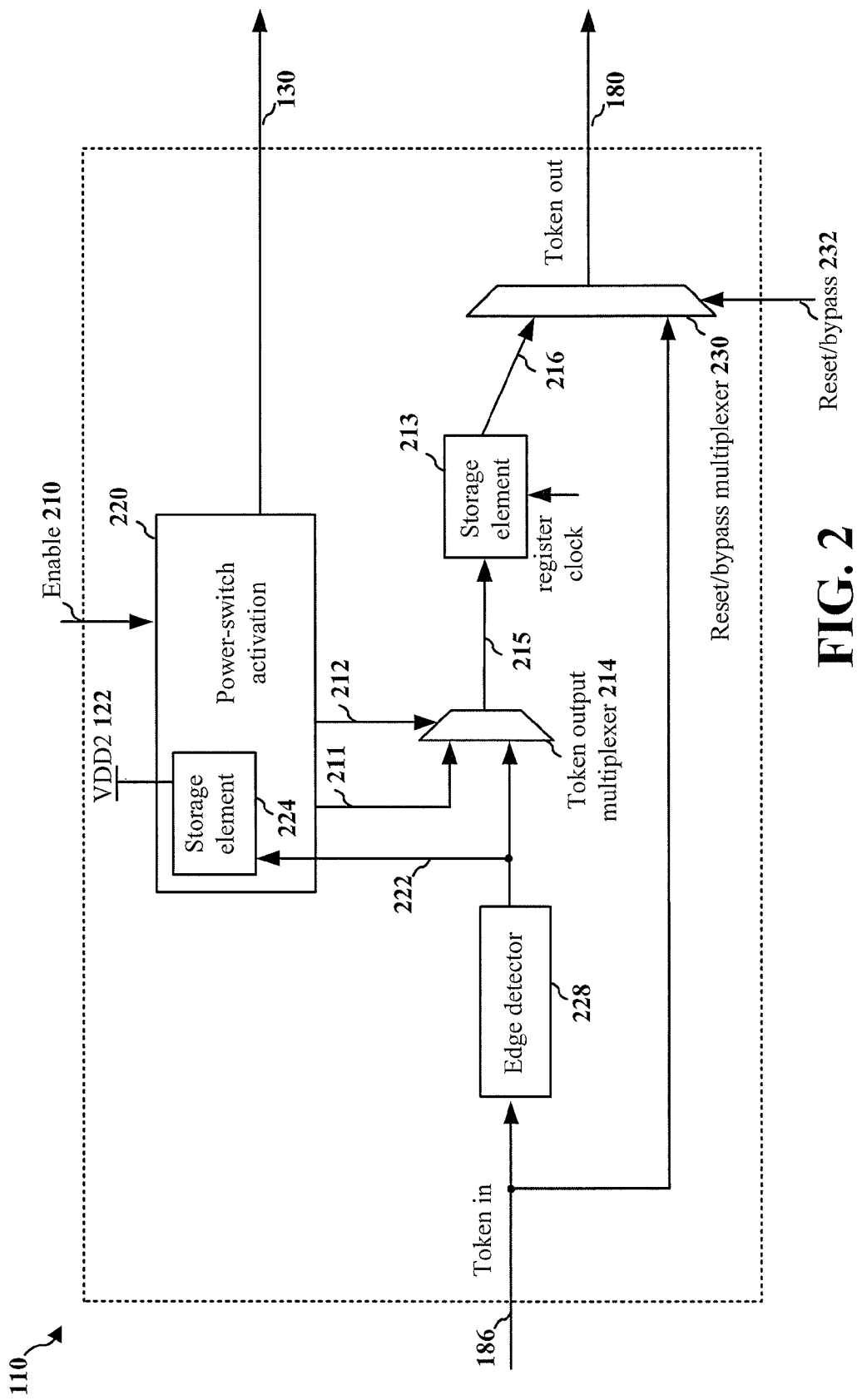
FIG. 2 is a block diagram of an exemplary embodiment of a power-switch control circuit.

FIG. 2 is a block diagram of an exemplary embodiment of a power-switch control circuit. The power-switch control circuit 110 receives the token from the signal line 186. In one implementation, the token is a state (e.g., a high state) on the signal line 186. The power-switch control circuit 110 includes an edge detector 228 configured to receive the token on the signal line 186 by, e.g., detecting a rising edge on the signal line 186 as the state on the signal line 186 transitions from a low state to a high state. Since the edge detector 228 is configured to detect an edge on the signal line 186, the token may be represented by a pulse. The edge detector 228 provides the captured token (e.g., information indicating a detection of state transition on the signal line 186) to the power-switch activation circuit 220 via the signal line 222. In one implementation, the edge detector 228 may generate a pulse on the signal line 222 as the information indicating a detection of state transition or a token on the signal line 186.

The power-switch activation circuit 220 is configured to activate the power switch 140 via the activation control signal 130, in response to receiving the token (e.g., receiving on the signal line 222 information indicating a detection of state transition or a token on the signal line 186). In one example, the activation control signal 130 activates by going to a low state. The power-switch activation circuit 220 receives an enable signal 210, indicating whether to power up the core 160. In one case, the received enable signal 210 is not activated (e.g., signal 210 is in a low state) and the power-switch control circuit 110 is not in a state for activating the power switch 140. In this case, power-switch activation circuit 220 deactivates the activation control signal 130 (e.g., forces the activation control signal 130 to a high state). The power switch 140 remains deactivated or in an off state, and the core 160 is not powered up. In another case, the received enable signal 210 is activated (e.g., signal 210 is in a high state) and the power-switch control circuit 110 is in a state of activating the power switch 140. In this case, the power-switch activation circuit 220 waits to activate activation control signal 130 (and the power switch 140), until after power-switch control circuit 110 receives the token. For example, the power-switch activation circuit 220, after receiving the enable signal 210, waits until the information indicating a detection of state transition or a token is received on the signal line 222, and then activates the activation control signal 130 (and the power switch 140) for powering up the core 160. Thus, the power-switch activation circuit 220 activates the power switch 140 for powering up the core 160 in response to receiving the token.

The power-switch control circuit 110 is configured to output the received token based on a state of powering up of the core 160, as described below. In one implementation, in a case that the power-switch control circuit 110 is in a state of not activating the power switch 140 (e.g., the enable signal 210 is low), the power-switch control circuit 110 outputs the token onto the signal line 180 upon receiving the token at the signal line 186. The power switch 140 is not activated in this case. In this case, the power-switch control circuit 110 does not need to use the token and passes the token onto the next stage (e.g., the power-switch control circuit 112 via the signal line 180). The release of the token allows the powering up of other cores (e.g., core 162) of the subsequent stages of the token ring 100.

For example, when the enable signal 210 is low, the power-switch activation circuit 220 outputs the select signal 212 such that the token output multiplexer 214 selects the output of the edge detector 228 at the signal line 222. The token output multiplexer 214, selected by the select signal 212, outputs the pulse on the signal line 222 (generated by the edge detector 228 in response to detecting the token on the signal line 186) onto the signal line 215. The signal line 215 is received by a storage element 213, such as a register, clocked by the register clock. The clocking of the storage element 213 prevents timing/glitch errors and erroneously passing the token. The storage element 213 outputs the captured token to the reset/bypass multiplexer 230 via the signal line 216.

The reset/bypass multiplexer 230 in a regular operating mode (e.g., not in a reset or bypass mode) selects the signal line 216, thus outputting the pulse on the signal line 222 (indicating the detection of the token on the signal line 186) onto the signal line 180. This example illustrates that the power-switch control circuit 110 outputs the received token to the next stage (e.g., the power-switch control circuit 112 via the signal line 180) with minimal delay, upon receiving the token at the signal line 186. The power switch 140 is not activated in this case.

The power-switch control circuit 110 is configured to output the received token based on the powering up state of the core 160, as described below. For example, the power-switch control circuit 110 may delay outputting the received token when the power switch 140 is powering up the core 160 (e.g., delaying outputting the received token until certain power up conditions are met). In one implementation, in a case that the power-switch control circuit 110 is in a state of activating the power switch 140 (e.g., the enable signal 210 is high), the power-switch activation circuit 220 holds the captured token (while activating the power switch 140), and delays outputting the token to the next stage (power-switch control circuit 112 via the signal line 180). In one aspect, such delay delays the activation of the power switch of a next stage (e.g., power switch 142) and thereby reduces the peak current for powering up the cores. In one example, the power-switch control circuit 110 holds and delays outputting the received token until a state of completing the powering up of the core 160. The state of completing the powering up of the core 160 may be determined, e.g., by a predetermined period of time that the power-switch control circuit 110 has been activating the activation control signal 130 or determined based a voltage level reached and settled on the node 150 of the core 160. In another example, the power-switch control circuit 110 may activate the power switch 140 in a sequence (e.g., power switch 140 comprises many individual transistors and the activation control signal 130 includes a multiple of physical signal lines corresponding to the transistors to allow the power switch 140 to be activated in the sequence). The state of completing the powering up of the core 160 may be determined, e.g., as reaching a particular stage of the activation sequence.

In one implementation, the enable signal 210 is activated (e.g., in a high state), and the power-switch activation circuit 220 outputs the select signal 212 such that the token output multiplexer 214 selects the signal 211. Upon receiving the token (e.g., receiving information on the signal line 222 indicating detection of state transition on the signal line 186), the power-switch activation circuit 220 delays outputting the token to the next stage until the conditions described above are met (e.g., power-switch control circuit 110 has the completed the powering up of the core 160). To output the token to the next stage, the power-switch activation circuit 220 outputs a pulse onto the signal 211. The token output multiplexer 214, selected by the select signal 212, outputs the pulse of the signal 211 onto the signal line 216 (via the clocked storage element 213). The reset/bypass multiplexer 230 in a regular operating mode (e.g., not in a reset or bypass mode) selects the signal line 216, thus outputting the pulse on the signal 211 (indicating the token release) onto the signal line 180 and the next power-switch control circuit 112.

The others stages of the token ring 100 operate in like fashion as described above with respect to power-switch control circuit 110. For example, the power-switch control circuit 112 receives the token outputted by the power-switch control circuit 110 at the signal line 180, activates the power switch 142 to power up the core 162, outputs the received token onto the signal line 182 based on a state of powering up the core 162 in similar fashion described above.

Various aspects of the token ring 100 are provided below as examples. In one implementation, the power-switch activation circuit 220 includes a storage element coupled to the power rail VDD2 122. A storage element may include, e.g., a register, a flip-flop, an SRAM, or other types of suitable memory known in the art. The storage element 224 stores information indicating that a token has been received (e.g., a pulse on the signal line 222). In an event that the voltage on the power rail VDD1 120 collapsed when the power switch 140 is activated and powering up the core 160 (e.g., too much current is drawn from the power rail VDD1 120), the storage element does not collapsed as it is powered by a different power rail. Thus, in a case that the power-switch control circuit 110 receives the token, collapses, and then reboots in a reset state, the storage element 224 stores the state of receiving the token so the token is not lost. While the power-switch control circuit 110 is in a reset state, the reset/bypass multiplexer 230 may be selected to bypass the power-switch control circuit 110.

In one implementation, an electronic apparatus may include token rings of power-switch control circuits in addition to token ring 100. In one example, each of the token rings may be configured for powering up cores by a different power rail. For example, as described above, the token ring 100 is configured to power up the cores 160, 162, 164, and 166 to the power rail VDD1 120. A second token ring may be configured to power up cores to a different power rail VDD3 124. In this fashion, the token of a token ring of power-switch control circuits does not cross the power domain boundaries.

In one implementation, each stage of the token ring 100 of the power-control switch circuits may be bypassed. In one example, the reset/bypass signal 232 is provided to the reset/bypass multiplexer 230 to bypass the power-switch control circuit 110. The reset/bypass signal 232 may cause the reset/bypass multiplexer 230 to select the signal line 186 to be outputted onto the signal line 180, bypassing the edge detector 228 and the power-switch activation circuit 220. In this fashion, a stage of the power-control switch circuits not in use may be bypassed so as to not unnecessarily delay the powering up of the other stages.

In one implementation, the control circuit 190 causes the power-switch control circuit 110 to detect that the token ring 100 is missing the token (e.g., no token is operating in the token ring 100). The power-switch control circuit 110 may detect such fault by detecting a timeout period (e.g., a period of time or number of cycles since the token was detected on the signal line 186). The timeout period may be programmable. The control circuit 190 may further cause the power-switch control circuit 110 to generate the token, e.g., by generating a pulse onto the signal line 180.

In one implementation, the number of the power switches 140, 142, 144, 146 activated to power up the cores 160, 162, 164, 166 is controlled by the number of tokens in the token ring 100. In a case that there is only one token in the token ring 100, only the one power-switch control circuit (one of 110, 112, 114, 116) receiving the token is able to activate the associated power switch (one of 140, 142, 144, 146) to power up the associated core (one of 160, 162, 164, 166). In a case there are two tokens in the token ring 100, two of the power-switch control circuits receiving the tokens are able to activate the associated power switches to power on the associated cores, and so forth. The number of the tokens in the token ring 100 may be programmable. In this fashion, the power-up peak current (as determined by the number of power switches been activated at once) may be controlled and programmed.

Figure 3:
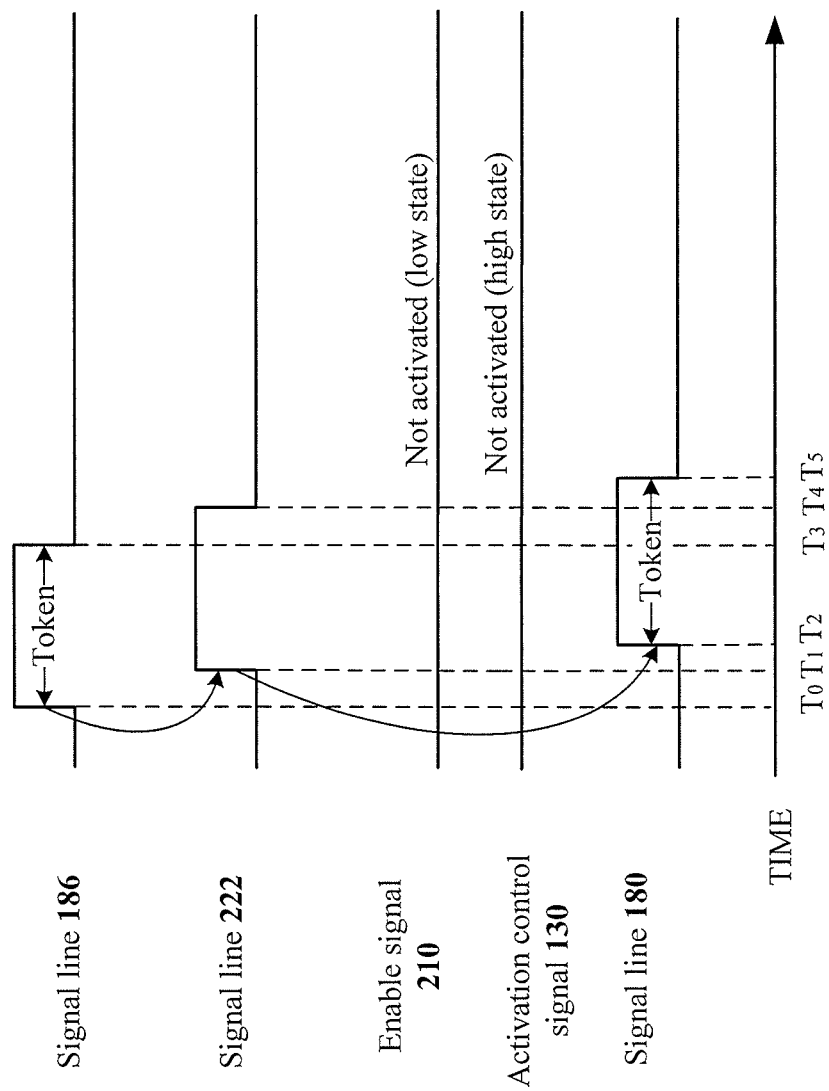
FIG. 3 is a timing diagram of the operations of an exemplary power-switch control circuit when an enable signal is not activated.

FIG. 3 is a timing diagram of the operations of an exemplary power-switch control circuit when an enable signal is not activated. The enable signal 210 is not activated (e.g., in a low state) and therefore, the power-switch activation circuit 220 may be bypassed. At $T_0$, a token (the pulse at $T_0$-$T_3$) is received on the signal line 186. The edge detector 228 detects the rising edge (at $T_0$) of the pulse on the signal line 186 and generates a pulse onto the signal line 222 (at $T_1$-$T_4$). Since the enable signal 210 is low, the power-switch activation circuit 220 is bypassed. The token output multiplexer 214 outputs the captured token to the signal line 215. At $T_2$, the register clock of the storage element 213 clocks, and the captured token on the signal line 215 is stored and outputted on the signal line 216. The reset/bypass multiplexer 230 selects the signal line 216 and outputs the token (the pulse at $T_2$-$T_5$) onto the signal line 180 for the next stage power-switch control circuit. At $T_5$, the register clock of the storage element 213 clocks to store a logic "0" (e.g., end of the token) onto the signal line 180 (via the storage element 213).

Figure 4:
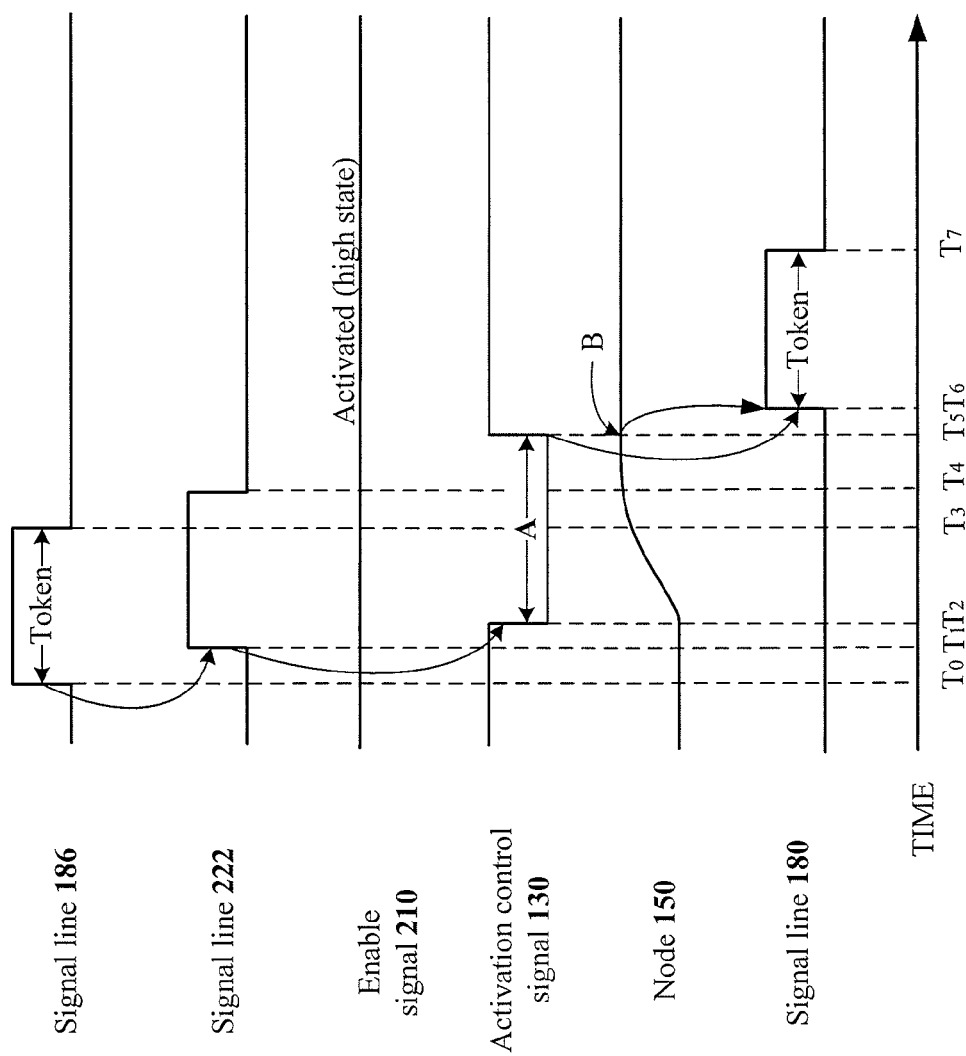
FIG. 4 is a timing diagram of the operations of an exemplary power-switch control circuit when an enable signal is activated.

FIG. 4 is a timing diagram of the operations of an exemplary power-switch control circuit when an enable signal is activated. In this case, the enable signal 210 is activated (e.g., in a high state). At $T_0$, a token (the pulse at $T_0$-$T_3$) is generated on the signal line 186. The edge detector 228 detects the rising edge (at $T_0$) of the pulse on the signal line 186 and generates a pulse onto the signal line 222 (at $T_1$-$T_4$). In response to receiving the pulse on the signal line 222 (at $T_1$-$T_4$), power-switch activation circuit 220 activates the activation control signal 130 (at $T_2$) to activate the power switch 140. Accordingly, the node 150 of the core 160 starts to power up (at $T_2$). The token (at $T_6$-$T_7$) is outputted onto the signal line 180 for the next stage power-switch control circuit based on a state of powering up the core 160. In one example, the state of powering up the core 160 includes that the activation control signal 130 been on for a predetermined period of time (at A). In another example, the state of powering up the core 160 includes the node 150 of the core 160 reaching and settling at a predetermined voltage (at B). The state of powering up the core 160 is reached at $T_5$ (by either A or B). The reset/bypass multiplexer 230 selects the pulse on the signal line 222 (via the token output multiplexer 214 and the storage element 213) and outputs the token (the pulse at $T_6$-$T_7$) onto the signal line 180 for the next stage power-switch control circuit.

Figure 5:
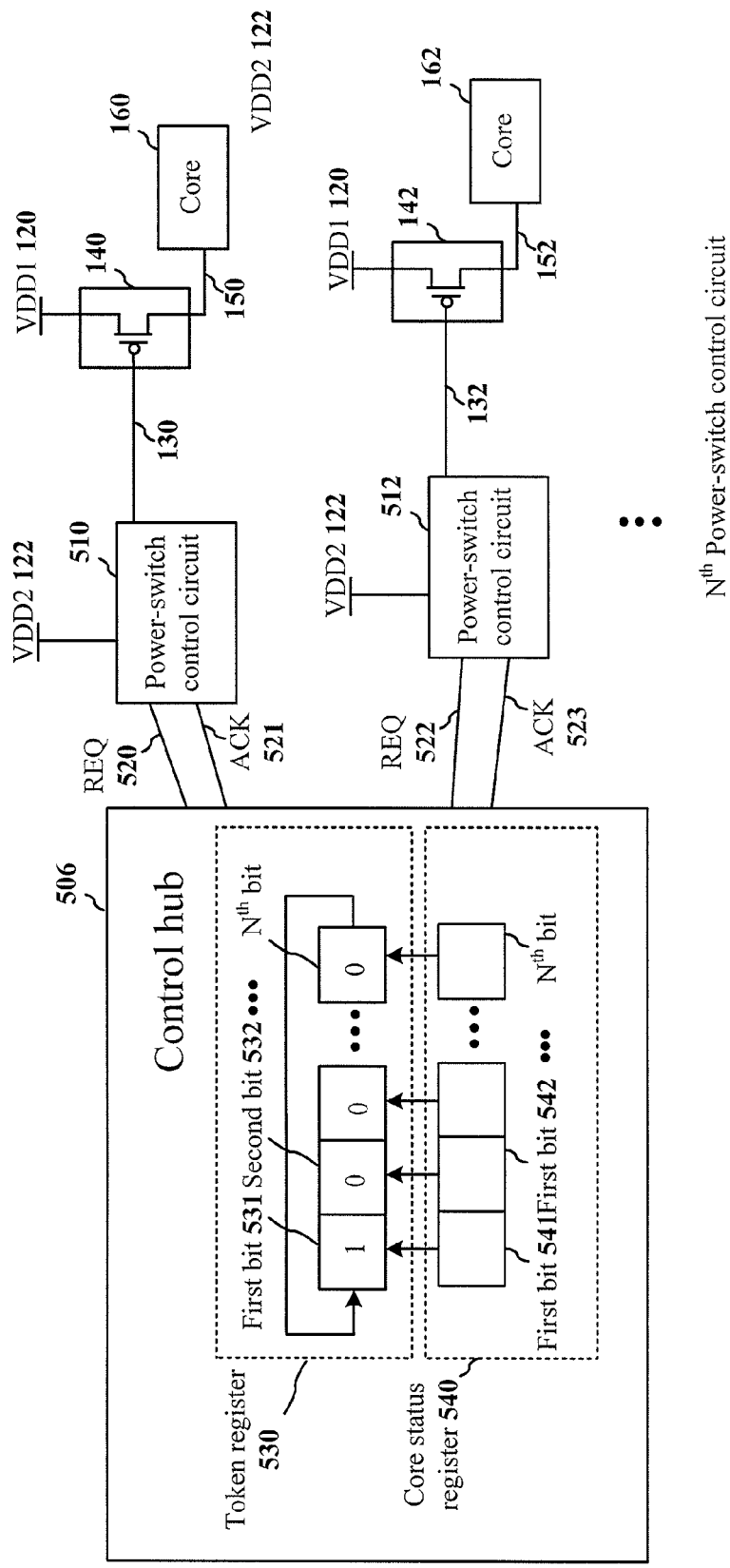
FIG. 5 is a block diagram of an exemplary embodiment of a control hub for power-switch control circuits.

FIG. 5 is a block diagram of an exemplary embodiment of a control hub for power-switch control circuits. The system includes a plurality of power-switch control circuits including the power-switch control circuit 510, the power-switch control circuit 512, and up to N power-switch control circuits. Each of the N power-switch control circuits controls a power switch for powering up a core. For example, the power-switch control circuit 510 generates the activation control signal 130 to activate the power switch 140 for powering up the core 160, as described previously with the power-switch control circuit 110. Here, each of the N power-switch control circuits may independently and in parallel request a token from the control hub 506 for activating the corresponding power switch. The control hub 506 is, e.g., a control circuit. Upon receiving requests for tokens, the control hub 506 arbitrates the requests to determine whether and when to issue a token to a requesting power-switch control circuit. In one example, the priority of the requesting power-switch control circuits, the number of power-switch control circuits powering up cores concurrently, and/or the selection algorithm may be programmable. In this fashion, the control hub 506 restricts the number of cores powering up at one time to reduce the peak current drawn from a power rail and to prevent a collapse of the power domain.

In one example, the power-switch control circuit 510 sends a request for token to the control hub 506 for activating the power switch 140 and powering up the core 160. The requesting, assigning, and releasing of a token and the form of the token itself may be in accordance with methods known in the art. An example is provided herein. The power-switch control circuit 510 sends a token request to the control hub 506 by activating (e.g., outputting a high state) the REQ 520 signal. The control hub 506 receives the token request and, in this case, decides to issue a token to the power-switch control circuit 510. To issue the token, the control hub 506 activates (e.g., outputs a high state) the ACK 521 signal. Upon receiving the token, the power-switch control circuit 510 activates the activation control signal 130 to activate the power switch 140 for powering up the core 160 (as described with the power-switch control circuit 110). When a powering up state of the core 160 is reached, the power-switch control circuit 510 releases the token (as described with the power-switch control circuit 110). The power-switch control circuit 510 notifies the control hub 506 the release of the token by deactivating (e.g., outputting a low state) both the REQ 520 signal and the ACK 521 signal. In one example, the N power-switch control circuits may operate as described above.

Figure 6:
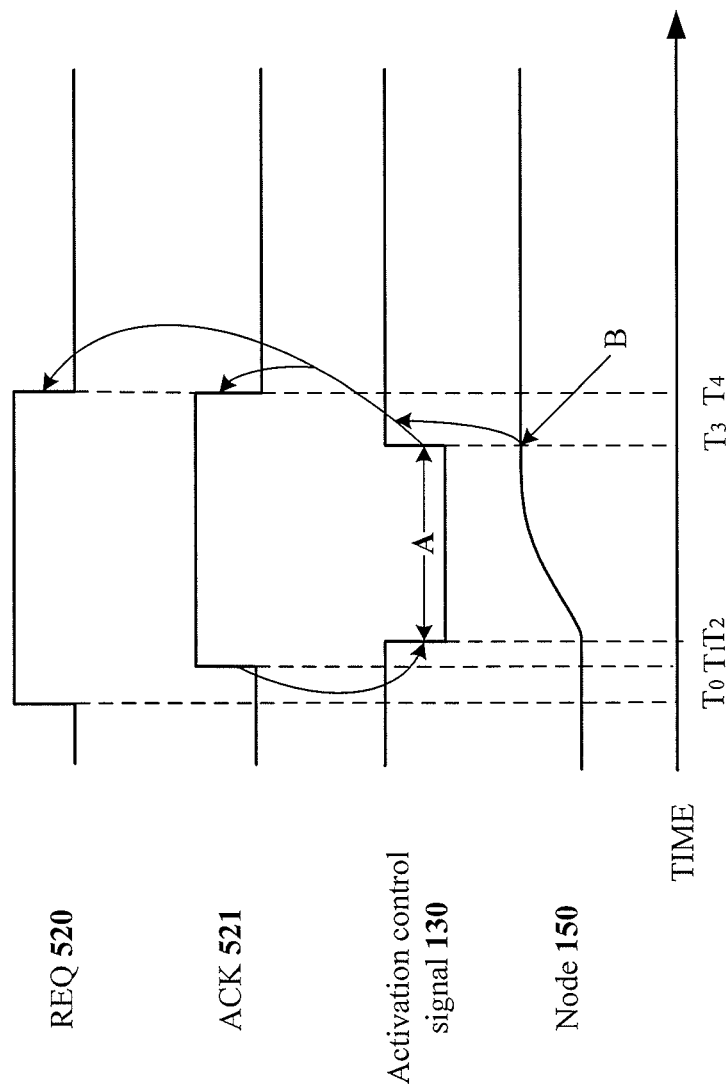
FIG. 6 is a timing diagram of the operations of a switch control circuit requesting and releasing a token from a control hub.

FIG. 6 is a timing diagram of the operations of a switch control circuit requesting and releasing a token from a control hub. At $T_0$, the power-switch control circuit 510 sends a token request to the control hub 506 by activating (e.g., outputting a high state) the REQ 520 signal. At $T_1$, the control hub 506 issues a token to the power-switch control circuit 510 by activating (e.g., outputs a high state) the ACK 521 signal. At $T_2$, the power-switch control circuit 510 activates (e.g., outputs a high state) the activation control signal 130 to activate the power switch 140 and power up the core 160. At $T_3$, a powering up state of the core 160 is reached. In one example, the state of powering up the core 160 includes that the activation control signal 130 been on for a predetermined period of time (at A). In another example, the state of powering up the core 160 includes the node 150 of the core 160 reaching and settling at a predetermined voltage (at B). At $T_4$, the power-switch control circuit 510 notifies the control hub 506 the release of the token by deactivating (e.g., outputting a low state) both the REQ 520 signal and the ACK 521 signal.

Referring back to FIG. 5, in one implementation, the control hub 506 includes a token register 530 (e.g. a storage element) for storing the token(s). The token register 530 may be a ring counter or a wrap-around shift register. In one example, each bit of the token register 530 is mapped to a power-switch control circuit. For example, the first bit 531 is mapped to the power-switch control circuit 510, the second bit 532 is mapped to the power-switch control circuit 512, and so forth (up to the $N^{th}$ bit). When the power-switch control circuit 510 requests the token, the control hub 506 determines whether to issue the token based on the corresponding bit of the token register 530. For example, the first bit 531 (mapped to the power-switch control circuit 510) stores the token (shown as "1" in the figure), the control hub 506 may thus issue the token to the power-switch control circuit 510. The second bit 532 (mapped to the power-switch control circuit 512) does not store the token (shown as "0" in the figure). Accordingly, if the power-switch control circuit 512 issues a token request at the same time as the power-switch control circuit 510, the control hub 506 would not issue the token to the power-switch control circuit 512. When a state of powering up the core 160 is reached, the power-switch control circuit 510 notifies the control hub 506 the release of the token. In response, the control hub 506 may shift the token to from the first bit 531 to the second bit 532. If the token request from the power-switch control circuit 512 remains active, the control hub 506 may issue the token thereto after shifting the token register 530.

In one implementation, the number of tokens stored in the token register 530 (which determines the number of cores that my power up at one time) and the priorities among the requesting power-circuit control circuits may be programmable by software. In one example, the control hub 506 is configured to receive requests for tokens from a plurality of power-switch control circuits 510, 512, etc., and configured to transmit a predetermined number of tokens (as programmed) to selected power-switch control circuits (510, 512, etc.), utilizing the token register 530 as described above and/or the programmed priorities. In one example, both the first bit 531 and the second bit 532 store tokens, and both the power-switch control circuit 510 and the power-switch control circuit 512 request the tokens from the control hub 506. In this case, a programmed priority among the cores may determine which of the power-switch control circuit 510 and the power-switch control circuit 512 may receive the token first. Moreover, the control hub 506 may transmit the predetermined number of tokens in a ring sequence utilizing the token register 530 as described above.

In one implementation, the control hub 506 may further include a core status register 540 (e.g., a storage element) which stores the power-up status of the cores. For example, the first bit 541 of the core status register 540 reflects the power up status of the core 160, the second bit 542 of the core status register 540 reflects the power up status of the core 162, and so forth. The control hub 506 may utilize the core status register for generating the ACK signals (e.g., ACK 521, ACK 523, etc.) for granting the tokens to the power-switch control circuits. For example, the control hub 506 may select the power-switch control circuits for receiving the (predetermined number) of tokens based the power-up statuses stored in the core status register 540. In one implementation, when the control hub 506 activate the ACK line to a particular core, the control hub 506 updates the corresponding bit of the core status register 540 as powered on. If any core requests the token (activating the REQ signal), the control hub 506 clears the corresponding bit of the requesting core in the core status register 540 and waits for the REQ signal to be deactivated by the requesting core. Based on the stored status of the core status register 540, the control hub 506 may move the token to the next core.

Figure 7:
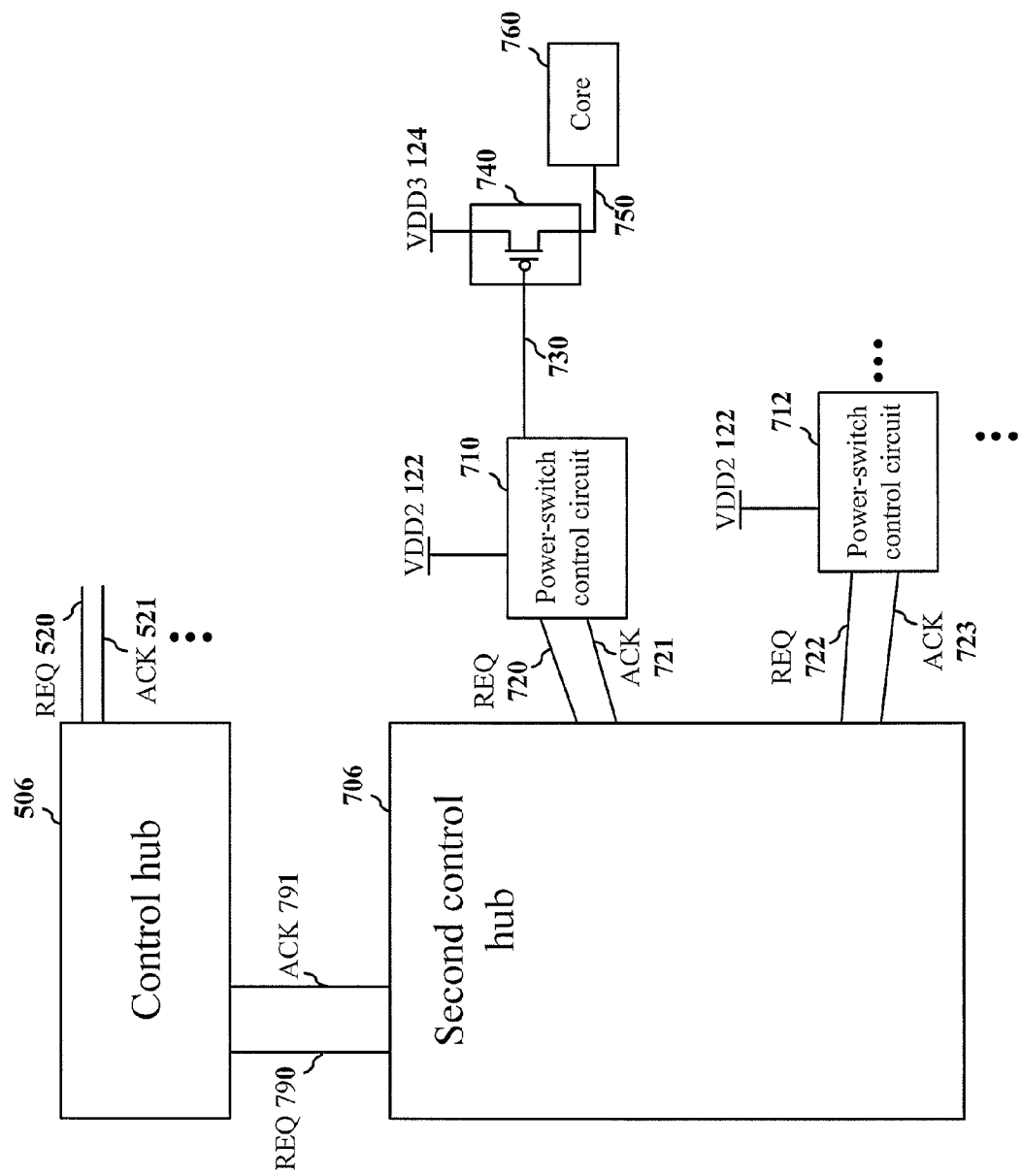
FIG. 7 is a block diagram of an exemplary embodiment of control hubs for power-switch control circuits.

FIG. 7 is a block diagram of an exemplary embodiment of control hubs for power-switch control circuits. A second control hub 706 (e.g., a control circuit) receives and provides tokens for powering up the cores. The cores are powered up using the power rail VDD3 124. The power rail VDD3 124 and the power rail VDD2 122 are in different power domains and/or different voltage domains. In one example, a plurality of power-switch control circuits 710, 712 (up to the $M^{th}$ power-switch control circuit) are coupled to the second control hub 706. Each of the M power-switch control circuits controls a power switch for powering up a core. For example, the power-switch control circuit 710 generates the activation control signal 730 to activate the power switch 740 for powering up the core 760, as described previously with the power-switch control circuit 110. Here, each of the M power-switch control circuits may independently and in parallel request a token from the second control hub 706 for activating the corresponding power switch. Upon receiving requests for tokens, the second control hub 706 arbitrates the requests to determine whether and when to issue a token to a requesting power-switch control circuit, as described with the control hub 506 (e.g., using a token register and/or a core status register). In this fashion, the second control hub 706 restricts the number of cores powering up at one time to reduce the peak current drawn from the power rail VDD3 124 and to prevent a collapse of the power domain.

In one example, the power-switch control circuit 710 issues a request to the second control hub 706 for a token for activating the power switch 740 and powering up the core 760 (via the node 750). The requesting, assigning, and releasing of a token and the form of the token itself may be in accordance with methods known in the art. In one example, the REQ 720 signal and the ACK 721 signal are utilized as with the control hub 506. The power-switch control circuit 710 sends a token request to the second control hub 706 by activating (e.g., outputting a high state) the REQ 720 signal. The second control hub 706 receives the token request and, in this case, decides to issue a token to the power-switch control circuit 710. To issue the token, the second control hub 706 activates (e.g., outputs a high state) the ACK 721 signal. Upon receiving the token, the power-switch control circuit 710 activates the activation control signal 730 to activate the power switch 740 for powering up the core 760 (as described with the power-switch control circuit 110). When a powering up state of the core 760 is reached, the power-switch control circuit 710 releases the token (as described with the power-switch control circuit 110). The power-switch control circuit 710 notifies the second control hub 706 the release of the token by deactivating (e.g., outputting a low state) both the REQ 720 signal and the ACK 721 signal. In one example, the M power-switch control circuits may operate as described above.

In one example, the second control hub 706 itself may need to acquire a token before it can grant the token to the requesting power-switch control circuit. The second control hub 706 may send the token request to the control hub 506, receive the token from the control hub 506, and send notice of the token release to the control hub 506 utilizing, e.g., the REQ 790 line and the ACK 791 line. The REQ 790 line and the ACK 791 line may operate in the same fashion as the REQ lines (e.g., REQ 520) and the ACK lines (e.g., ACK 521) described above. In one example, the control hub 506 handles the token request from the second control hub 706 in the same fashion as described above. For example, the control hub 506 may treat the second control hub 706 as another power-switch control circuit.

In a case the second control hub 706 receives the token from the control hub 506, the second control hub 706 may transmit the token to one or more of the requesting power-switch control circuits connected to the second control hub 706. The second control hub 706 may select the requesting power-switch control circuits for receiving the tokens in the same fashion as described with the control hub 506.

Figure 8:
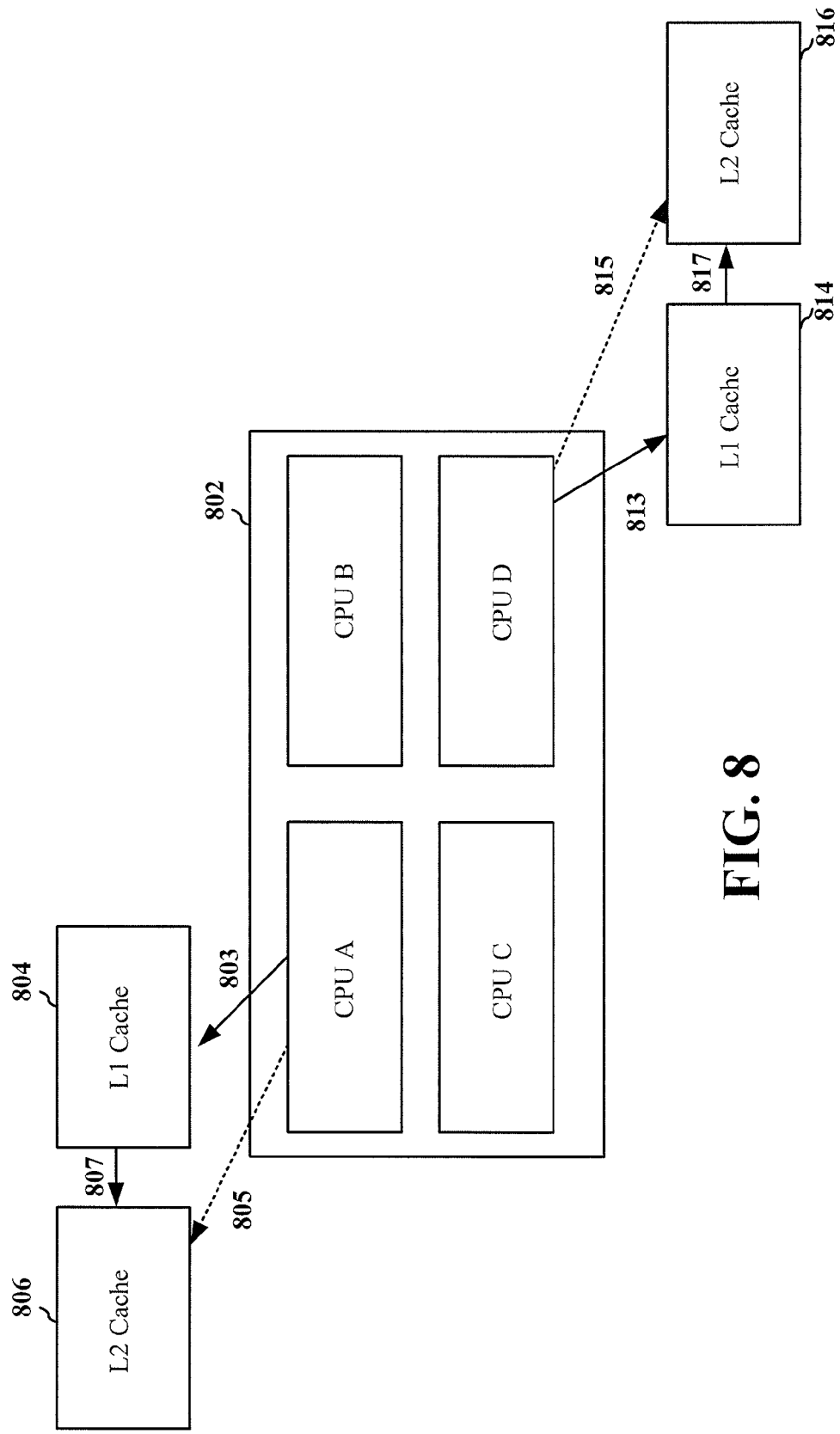
FIG. 8 is a block diagram of an exemplary embodiment of a token-based, hierarchical power-up system.

Further aspects of the disclosure are presented. FIG. 8 is a block diagram of an exemplary embodiment of a token-based, hierarchical power-up system. In one configuration, the token ring 100 and/or the control hub 506 allow autonomous control of individual cores. FIG. 8 illustrates a cluster 802 of central processing units (CPUs) CPU A, CPU B, CPU C, and CPU D. Each of the CPUs may be associated with its own L1 cache and L2 cache, etc. Only the associated caches for CPU A and CPU D are shown for clarity. As shown, the CPU A is associated with the L1 cache 804 and the L2 cache 806. In one example, each of the CPU A, the L1 cache 804, and the L2 cache 806 may operate in different voltage or power domains. The token-based, hierarchical power-up scheme allows the CPU A autonomous control of the power-up process. In one example, each of the CPU A, the L1 cache 804, and the L2 cache 806 operates in its own token ring (such as the token ring 100). In a case that a power-switch control circuit of a token ring of the CPU A receives a token, the power-switch control circuit of the CPU A may provide a token to a client token ring (e.g., to a power-switch control circuit of a token ring of the L1 cache 804 or the L2 cache 806) to force or initiate the power-up process in the client token ring (803 and 805). In another example, a power-switch control circuit of the token ring of the L1 cache 804, upon receiving the token from a power-switch control circuit of the token ring of the CPU A, may in turn provide the token to its client token ring (e.g., a power-switch control circuit of the token ring of the L2 cache 806). In one configuration, the token ring of the CPU A and its client token rings (e.g., the token ring of the L1 cache 804 and token ring of the L2 cache 806) may operate in different voltage domains. For example, the CPU A may be powered up to a first voltage. The L1 cache 804 may be powered up to a second voltage different from the first voltage. The L2 cache 806 may be powered up to a third voltage different from the first and second voltages.

The token-based, hierarchical power-up system may be implemented using the control hub (e.g., the control hub 506) in place of the token rings presented above. In one example, a control hub of the CPU A receives a power up event (to power up the CPU A), the control hub of the CPU A may provide a token or a notification to a client control hub (e.g., to a control hub of the L1 cache 804 or the L2 cache 806) to force or initiate the power-up process in the control hub (803 and 805). In another example, a control hub of the L1 cache 804, upon receiving the token or notification from the control hub of the token ring of the CPU A, may in turn provide the token or notification to its client control hub (e.g., a control hub of the L2 cache 806).

Various advantages flow from the token-based, hierarchical power-up systems presented above, as would be recognized by persons of ordinary skill in the art. For example, a CPU (such as the CPU A) and its associated caches may power up at the same time with the relatively simple system. Without this aspect of the token-based, hierarchical power-up system, the CPU may receive the token and may power up, but its L1 cache might not receive a token at the same time as the CPU (since they are on different token rings or belong to different token hubs). Powering up the CPU without its L1 cache also being powered up may be a waste of power since the CPU might not be able to perform instructions without the L1 cache also being powered up.

In one configuration, a power switch (such as the power switch 140) utilizing a token-based power-up scheme may be simplified. For example, the power switch does not need to include a plurality of power-up transistors having staggered activations, as the in-rush current may be mitigated by the token power-up system (e.g., the token ring 100 or the control hub 506). Consequently, the power switch (such as the power switch 140) of the disclosed systems may be reduced in size compared to a conventional power switch. In another configuration, a power-up event (such as a wake-up command) may be broadcasted to a plurality of cores in parallel. For example, referring to FIG. 1, the power-up event may be broadcasted to all the power-switch control circuits in parallel, as the powering up of the cores is individually controlled by the token ring 100. The broadcast, for example, enables the powering up of multiple cores (but the actual power up is still controlled by the token). In this fashion, the controls of the power-up event are simplified. For example, the wake up command may be sent by software independent of the token ring/hub. Moreover, the cores may receive the wake up command at approximately the same time, but they will not be able to wake up at the same time (causing the in-rush current issue). Instead, each of the cores will wake up when it receives the token. In one example, only one token is programmed in a token ring, and the cores will wake up (be powered up) one at a time even though all the cores received the wake up command at the same time (since the wake up command was broadcasted to all the cores). In this fashion, the controls for waking up all the cores may be simplified and the in-rush current issue may be mitigated.

Figure 9:
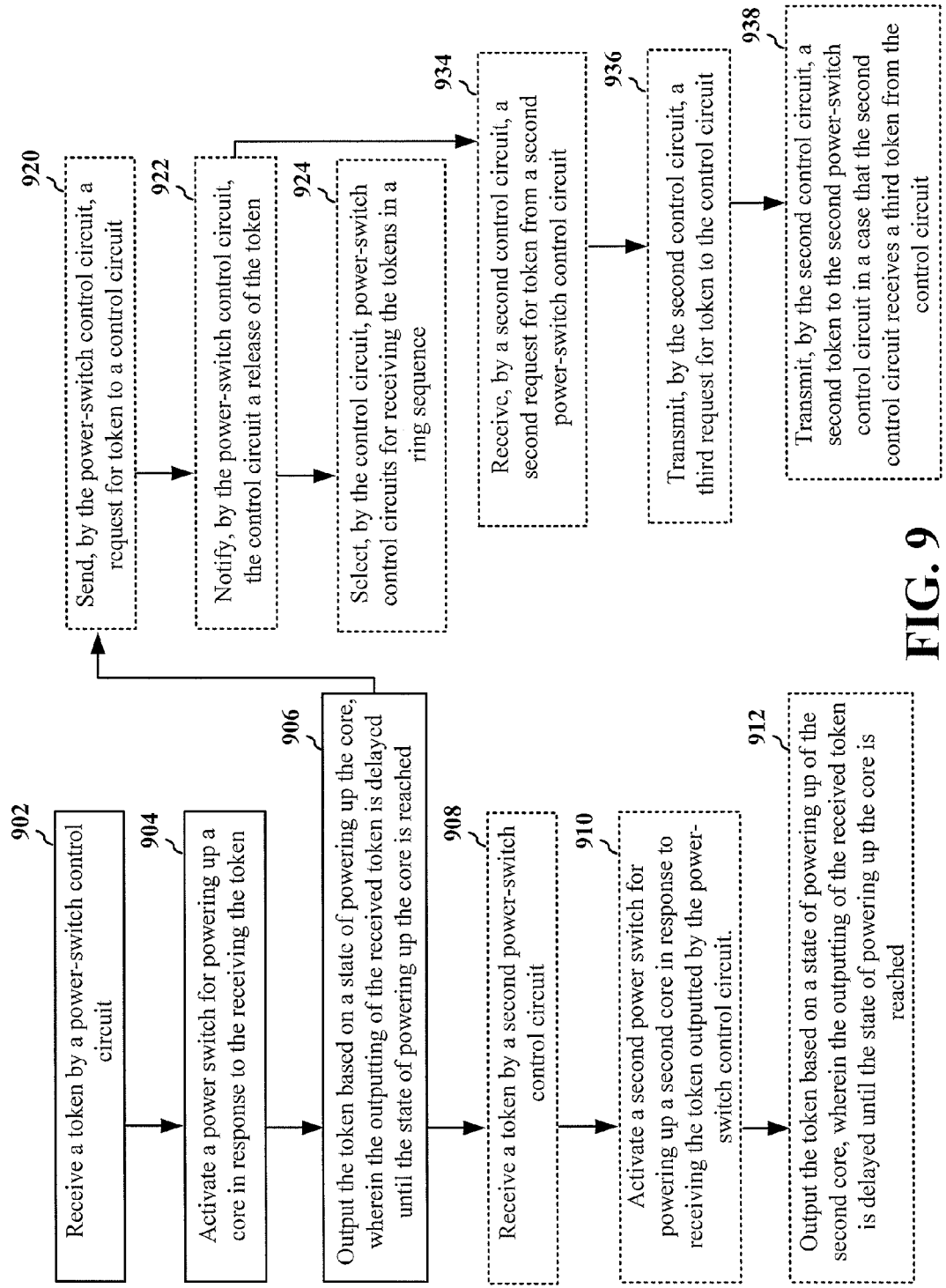
FIG. 9 is a flowchart of operations of an exemplary embodiment of power-switch control circuits.

FIG. 9 is a flowchart of operations of an exemplary embodiment of power-switch control circuits. The steps drawn in dotted lines may be optional. At 902, a token is received by a power-switch control circuit. See, e.g., FIG. 2 and the associated text providing that the power-switch control circuit 110 receives the token on the signal line 186. In one example, the power-switch control circuit 110 (e.g. the edge detector 228) provides the means for receiving the token. At 904, a power switch for powering up a core is activated in response to the receiving the token. See, e.g., FIGS. 2 and 3 describing that the power-switch control circuit 110 activates the power switch 140 for powering up the core 160 in response to receiving the token. In one example, the power-switch control circuit 110 (e.g., the power-switch activation circuit 220) provides the means for activating a power switch for powering up a core in response to the receiving the token. At 906, the token is outputted based on a state of powering up the core. The outputting of the received token may be delayed until the state of powering up the core is reached. See, e.g., FIGS. 2 and 4 describing that the power-switch control circuit 110 outputting the token based on a state of powering up of the core 160. The power-switch control circuit 110 delays outputting the token until the state of powering up of the core 160 is reached at $T_6$ by way of A or B. In one example, the power-switch control circuit 110 (e.g., the power-switch activation circuit 220) provides the means for outputting the token based on a state of powering up of the core 160. At 908, a token is received by a second power-switch control circuit. At 910, a second power switch is activated for powering up a second core in response to receiving the token outputted by the power-switch control circuit. At 912, the token is outputted based on a state of powering up of the second core. The outputting of the received token is delayed until the state of powering up the core is reached. See, e.g., the power-switch control circuit 112 which operates in a like fashion as the power-switch control circuit 110. For example, the power-switch control circuit 112 receives the token on the signal line 180 and activates the power switch 142 for powering up the core 162. The power-switch control circuit 112 output puts the token onto the signal line 182 based on a state of powering up of the core 162. In one example, the power-switch control circuit 112 provides the means for receive a token, the means for activating the power switch 142 for powering up a core 162 in response to receiving the token outputted by the power-switch control circuit 110, and the means for output the token based on a state of powering up of the core 162.

At 920, the power-switch control circuit sends a request for token to a control circuit. See, e.g., FIG. 5 and the associated text providing that the power-switch control circuit 510 sends a quest for token to the control hub 506 by the REQ 520 signal. In one example, the power-switch control circuit 510 provides the means for sending a request for token to the control hub 506. At 922, the power-switch control circuit notifies the control circuit a release of the token. See, e.g., FIG. 5 and the associated text providing that the power-switch control circuit 510 notifies the control hub 506 a release of the token by operations of the REQ 520 signal and the ACK 521 signal. In one example, the power-switch control circuit 510 provides the means for notifying the control hub 506 a release of the token. At 924, the control circuit selects power-switch control circuits for receiving the tokens in a ring sequence. See, e.g., FIG. 5 and the associated text providing that the power-switch control circuit 510 selects from among M power-switch control circuits the power-switch control circuits for receiving the tokens in a ring sequence by, e.g., utilizing the token register 530. In one example, the control hub 506 provides the means for selecting power-switch control circuits for receiving the tokens in a ring sequence.

At 934, a second control circuit receives a second request for token from a second power-switch control circuit. See, e.g., FIG. 7 and the associate text for providing that the second control hub 706 receives the request for token form the power-switch control circuit 710. In one example, the second control hub 706 provides the means for receiving the request for token from the power-switch control circuit 710. At 936, the second control circuit transmits a third request for token to the control circuit. See, e.g., FIG. 7 and the associate text for providing that the second control hub 706 transmits a request for token to the control hub 506 via the REQ 790 signal. In one example, the second control hub 706 provides the means for transmitting the request for token to the control hub 506. At 938, the second control circuit transmits a second token to the second power-switch control circuit in a case that the second control circuit receives a third token from the control circuit. See, e.g., FIG. 7 and the associate text for providing that the second control hub 706 receives the token from the control hub 506 by the ACK 791 signal. The second control hub 706 then transmits the token to the power-switch control circuit 710 in that case. In one example, the second control hub 706 provides the means for transmitting the token to the power-switch control circuit 710 in a case that the second control hub 706 receives the token from the control hub 506. Examples of these operations are further described in association with FIGS. 1-7.

The specific order or hierarchy of blocks in the method of operation described above is provided merely as an example. Based upon design preferences, the specific order or hierarchy of blocks in the method of operation may be re-arranged, amended, and/or modified. The accompanying method claims include various limitations related to a method of operation, but the recited limitations are not meant to be limited in any way by the specific order or hierarchy unless expressly stated in the claims.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A electronic apparatus, comprising:
a power switch configured to selectively provide power to a core;
a power-switch control circuit configured to:
receive a token,
activate the power switch in response to receiving the token, and
output the received token to a second power-switch control circuit based on a state of powering up the core, wherein the outputting of the received token is delayed until the state of powering up the core is reached;
a second power switch configured to selectively provide power to a second core; the second power-switch control circuit configured to:
receive the token outputted by the power-switch control circuit, and
activate the second power switch in response to receiving the token outputted by the power-switch control circuit; and
one or more additional power-switch control circuits, wherein the second power-switch control circuit is configured to provide the token to the power-switch control circuit via the one or more additional power-switch control circuits.

2. The electronic apparatus of claim 1, wherein the power-switch control circuit, the second power-switch control circuit, and the one or more additional power-switch control circuits are a plurality of power-switch control circuits, and the plurality of power-switch control circuits are configured as a ring.

3. The electronic apparatus of claim 2, further comprising a second plurality of power-switch control circuits configured as a second ring to provide power to a core in the second ring in response to receiving a second token.

4. The electronic apparatus of claim 3, wherein the ring of the plurality of power-switch control circuits operates in a first voltage domain, and the second ring of the second plurality of power-switch control circuits operates in a second voltage domain.

5. The electronic apparatus of claim 2, wherein the power-switch control circuit is further configured to detect a failure in the ring of the plurality of power-switch control circuits by counting a predetermined amount of time or a number of cycles since receiving the token.

6. The electronic apparatus of claim 5, wherein the power-switch control circuit is further configured to generate a new token in the ring of the plurality of power-switch control circuits.

7. The electronic apparatus of claim 1, wherein the power-switch control circuit is further configured to selectively output the token upon receiving the token without activating the power switch.

8. The electronic apparatus of claim 1, wherein the power-switch control circuit is configured to output the token upon receiving the token when the power-switch control circuit is in a reset state.

9. The electronic apparatus of claim 1, wherein the power-switch control circuit is configured to delay outputting the token to the second the power-switch control circuit when the power switch is powering up the core.

10. The electronic apparatus of claim 1, wherein the power-switch control circuit comprises a storage element configured to store a state of receiving the token.

11. The electronic apparatus of claim 1, further comprising
a token control circuit including a storage element storing the token, wherein the power-switch control circuit is configured to send a request for the token to the token control circuit and to notify the token control circuit of a release of the token.

12. The electronic apparatus of claim 11, wherein the token control circuit is configured to receive requests for the token from a plurality of power-switch control circuits, including the power-switch control circuit, and configured to transmit a predetermined number of tokens to selected power-switch control circuits among the plurality of power-switch control circuits.

13. The electronic apparatus of claim 12, wherein the token control circuit is configured to select power-switch control circuits for receiving the predetermined number of tokens based on programmable priorities.

14. The electronic apparatus of claim 12, wherein the predetermined number of tokens transmitted to the selected power-switch control circuits is programmable.

15. The electronic apparatus of claim 12, further comprising a second storage element for storing a power-up status of each of the plurality of power-switch control circuits, and the token control circuit is configured to select power-switch control circuits for receiving the predetermined number of tokens based the power-up status stored in the second storage element.

16. The electronic apparatus of claim 12, wherein the token control circuit is configured to select power-switch control circuits for receiving the predetermined number of tokens in a ring sequence.

17. The electronic apparatus of claim 11, further comprising a second token control circuit configured to:
receive a second request for the token from a third power-switch control circuit configured to selectively provide power to a third core;
transmit a third request for the token to the token control circuit;
transmit the token to the third power-switch control circuit in a case that the second token control circuit receives the token from the token control circuit.

18. A method for operating an electronic apparatus, comprising:
receiving a token by a power-switch control circuit;
activating a power switch for powering up a core in response to the receiving the token;
outputting the token to a second power-switch control circuit based on a state of powering up the core, wherein the outputting of the received token is delayed until the state of powering up the core is reached
receiving the token by the second power-switch control circuit; and
activating a second power switch for powering up a second core in response to the receiving the token by the second power-switch control circuit,
wherein the second power-switch control circuit is configured to provide the token to the power-switch control circuit via one or more additional power-switch control circuits.

19. The method of claim 18, further comprising broadcasting an event for enabling powering up of a plurality of cores.

* * * * *